June 3, 1947.　　　C. T. TORRESEN　　　2,421,443
CLAMP
Filed July 13, 1943

Carel T. Torresen
INVENTOR.

BY Edwin Coates
ATTORNEY.

Patented June 3, 1947

2,421,443

UNITED STATES PATENT OFFICE 2,421,443

CLAMP

Carel T. Torresen, Santa Monica, Calif.

Application July 13, 1943, Serial No. 494,545

4 Claims. (Cl. 248—74)

This invention relates to a supporting clamp adapted for use in aircraft. While it may be attached to a frame or bracket and used to support a cylindrical object, such as a conduit, its primary purpose is to attach to a cylindrical portion of a framework, such as a tubular member, to suspend some device therefrom.

In present day aircraft many accessories, hydraulic and electric lines, and the like are distributed thruout the structure, and a great variety of clamps and brackets have been used to support them and hold them in place. Conventional supports used in other arts have generally been found to be unsatisfactory because of the exacting demands of aircraft practice. Lightness, strength, and absolute reliability are essential. Any device which is to meet these demands must be as light as it is possible to make it while retaining adequate strength and resistance to failure thru fatigue or vibration.

Accordingly one of the principal objects of this invention is to produce a supporting clamp which is lighter than clamps of the prior art intended for similar use. A concomitant object is to produce a clamp of such design that it may be made of a light metal, such as aluminum alloy, and still be as strong and resistant to deformation as contemporary clamps made of a heavy metal, such as steel.

Another object is to provide a clamp of such design as to use the shortest practicable clamping bolt, thus further reducing the total weight of the assembly.

A further object is to provide a clamp having clamping contact thruout substantially 100% of the periphery of the cylindrical article engaged.

An additional object is to provide a clamp which will readily conform to the tubular object being clamped and will effectively resist displacement, at the same time obtaining a very good electrical bond which must be maintained between all metal parts of aircraft structures.

The manner in which these and other objects are attained will become apparent as the description proceeds.

The present preferred form of the invention is disclosed in the accompanying drawing in which.

Figure 1:
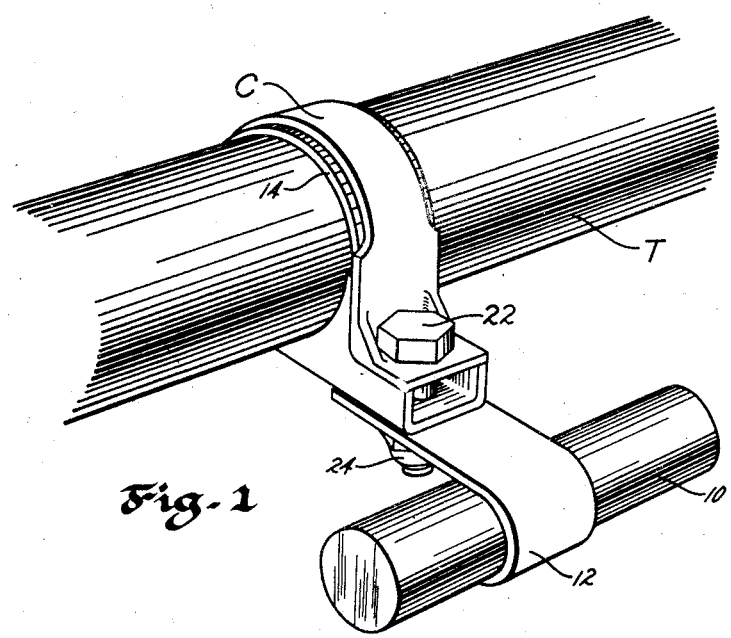
Fig. 1 is a perspective view showing the novel clamp in position on a tubular structure such as a part of an airplane engine mount.

In Fig. 1 the clamp C is shown in binding engagement with a tubular member T, which may be a structural part of the framework supporting the engine of an airplane. The purpose of the clamp may be to support a rod 10 thru the intermediary of a bracket 12 as shown. This bracket forms no part of the present invention but merely serves to illustrate its utility.

A liner 14 is arranged between the clamp and the support and serves a variety of functions. It is made of yieldable, non-metallic material and facilitates conformance with supports having slight surface irregularities. Such material also provides qualities of shock and vibration absorption, thus reducing possibilities of fatigue failure or loosening of the clamp in service. If the material selected is one similar to that used in brake lining it will have the further desirable features of heat resistance and a high coefficient of friction. The heat resistance is of particular importance in installations in an airplane engine nacelle or other location where high temperatures are encountered. The high coefficient of friction insures against slippage without requiring excessively high clamping loads.

Figure 2:
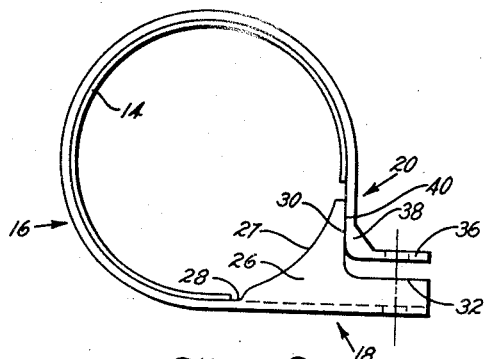
Fig. 2 is a side elevational view.
Figure 3:
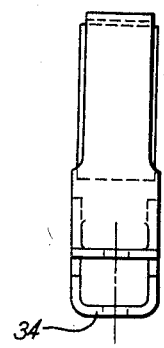
Fig. 3 is an end elevational view of the clamp of this invention.

As best seen in Fig. 2, the clamp is composed of three major portions, an intermediate, bendable strap-like portion 16 constituting approximately three quarters of a circle, a first free end 18 so formed as to be substantially rigid, and a second free end 20 adapted to be pulled into seating engagement with the first free end by a bolt 20 and nut 24 shown in Fig. 1. An exaggerated spacing of the two free ends is shown in Figs. 2 and 3 for clarity but the members are actually brought into solid engagement as shown in Fig. 1 to make an unusually rigid connection.

In the preferred form of the invention, the entire clamp is made from a single flat piece of metal. Member 18 is provided with a pair of ears 26 bent inward toward the center of the clamp and forming a channel, as seen in Figs. 1 and 3, of great strength and rigidity. The inner periphery of ears 26 is given an arcuate form as indicated at 27 to match the periphery of the cylindrical support. A small step is provided at 28 corresponding to the thickness of the liner, so that the ears and the liner have the same radius of curvature. In cases where the use of a liner is not desired, the step is omitted and the radius of curvature of the ears corresponds to that of the inner periphery of the intermediate portion.

The ears 26 are each further provided with a first seat or guide 30 tangential to the inner periphery of the intermediate portion and a second seat 32 parallel to the web 34 of the channel. Their purpose will become apparent as the description proceeds.

It will be obvious to those skilled in the art that the member 18 may be made solid instead of channel shaped and such construction is considered to be within the purview of the invention.

The second free end 20 is a continuation of the strap-like intermediate portion 16 and is bent at right angles at its extreme end to form an attachment ear 36. Flanges 38 are formed at the bend to reinforce it and maintain the desired angularity. These flanges may be as large as necessary and may extend to the end of the ear 36 to form a channel section of great rigidity. The portion 40 of member 20 is slidably guided by the tangential face 30 and the proper relationship of the parts is maintained while the ear 36 is drawn into engagement with seat 32. The sizes of all parts are so chosen that proper gripping action is obtained as parts 32 and 36 come together. Consequently, overtightening of the bolt 22 and nut 24 by an inexperienced workman can-and distort the clamp.

Contact along the entire seat 32 prevents any pivotal movement of member 18 about its point of contact with the nut or bolt and thus obviates any bending load in the vicinity of step 28. The tangential arrangement of member 20 in combination with the guiding action of face 20 provides a straight tension pull as the bolt and nut are tightened. Hence the clamp is drawn into engagement with its support in an ideal manner.

In any aircraft installation, it is essential that electrical bonding be maintained between all metallic parts. The use of a non-metallic liner is generally necessary or desirable as outlined above. The conventional way of obtaining bonding in connection with the use of such a liner would be to provide a separate, thin metal strip overlying or woven thru the liner and welded, soldered or otherwise secured to the body of the clamp. Such an arrangement requires additional parts and frequently results in defective bonding since the weld or other connection has a tendency to fail in service. This invention provides an ideal solution to the entire problem.

Each of the ears 26 presents a narrow arcuate face which contacts the supporting tube thru almost a quarter of a circle. This narrow surface provides an intimate engagement with high unit pressure and tends to force out of the way any small particles of foreign matter which might interfere with electrical conductivity. A broad, relatively flat face, on the contrary, would be held out of contact by such foreign matter. Since the bonding portion of the clamp is integral with the main body of the clamp there is no possibility of failure of the bonding connection in use.

The relative arrangement of the rigid and bendable parts of the clamp together with the position of the liner provides a construction which conforms very closely with the surface of the supporting member and which grips the supporting member thruout substantially its entire periphery while providing vibration absorption and electrical bonding with a minimum number of parts.

It will be observed that very tight clamping and a very rigid connection are obtained while using a very short bolt. In prior art constructions a pair of very large ears have been used and they have necessitated a bolt at least three times as long as the bolt used in this invention, thus adding considerable weight without obtaining any beneficial result.

The clamp of the present invention is primarily intended to be attached to a steel tube supporting structure but it is obvious that it is equally well suited to support a conduit or the like, in which case the bolt 22 and nut 24 will serve to produce the clamping effect and also attach the clamp to a supporting structure.

While the preferred form of the invention has been described above and illustrated in the accompanying drawing, it will be obvious to those skilled in the art that various modifications may be made without departing from the spirit of the invention and it is intended that all such modifications shall be comprehended within the scope of the following claims.

I claim:

1. In a supporting clamp: a metallic strap; a first free end of said strap being substantially straight and provided with a pair of ears bent inwardly at substantially right angles to the plane of said free end; the intermediate portion of said strap having an arcuate form constituting substantially three quarters of a circle; the inner margins of said ears having a periphery complementing the intermediate portion; the outer margins of said ears being substantially straight and tangential to said circle; the second free end of said strap being substantially straight and tangential to said circle and overlying the straight portions of said ears; and bolt receiving means at the extreme ends of said two free ends.

2. In a clamp: an intermediate bendable portion of substantially arcuate form; a rigid member integral with one end of said intermediate portion comprising a pair of ears bent inwardly to serve as reinforcements, said ears each having an arcuate inner periphery substantially complementary to the arcuate form of said intermediate portion; a cantilever extension on said rigid member; an attachment member carried by the other end of said intermediate portion; and adjustable means acting on said attachment member in tension and on said rigid member in bending to draw them together in clamping relation.

3. The device as described in claim 2 in which said rigid member is provided with a guide surface at right angles to said cantilever extension, and in which said attachment member overlies and is supported by said guide surface in slidable relation.

4. In a clamp: an intermediate bendable portion of substantially arcuate form; a rigid member integral with and forming a continuation of said intermediate portion and including a cantilever extension, said rigid member and said extension comprising a channel made up of a web substantially tangent to said bendable portion and a pair of inwardly bent ears; said ears each having an arcuate inner periphery substantially complementary to the arcuate form of said intermediate portion; the outer portions of said ears being provided with seat portions parallel to said web and with guide portions at right angles to said web; an attachment member carried by the other end of said intermediate portion consisting of a strap-like portion extending at right angles to said web and in slidable contact with said guide portions and means at its extreme free end for contact with said seat portions; and adjustable means acting on said attachment member in tension and on said rigid member in bending to draw them together in clamping relation.

CAREL T. TORRESEN.

REFERENCES CITED

The following references are of record in the file of this patent:

UNITED STATES PATENTS

| Number | Name | Date |
| --- | --- | --- |
| 2,331,258 | White | Oct. 5, 1943 |
| 1,284,325 | Hart | Nov. 12, 1918 |
| 1,473,715 | Wessel | Nov. 13, 1923 |
| 1,684,666 | Frazier | Sept. 18, 1928 |